US009712628B2

(12) United States Patent
Chamiel et al.

(10) Patent No.: US 9,712,628 B2
(45) Date of Patent: *Jul. 18, 2017

(54) CLICK THROUGH RATE ESTIMATION IN VARYING DISPLAY SITUATIONS

(71) Applicant: Taboola.com Ltd, Tel Aviv (IL)

(72) Inventors: Gil Chamiel, Tel Aviv (IL); Lior Golan, Tel Aviv (IL); Asaf Rubin, Moshav Herev Le'et (IL); Aviv Sinai, Rishon LeZion (IL); Moshe Salomon, Elazar (IL); Alon Pilberg, Ramat Gan (IL)

(73) Assignee: TABOOLA.COM LTD, Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/995,421

(22) Filed: Jan. 14, 2016

(65) Prior Publication Data

US 2016/0142499 A1    May 19, 2016

Related U.S. Application Data

(63) Continuation of application No. 13/860,887, filed on Apr. 11, 2013, now Pat. No. 9,294,577.

(60) Provisional application No. 61/622,810, filed on Apr. 11, 2012.

(51) Int. Cl.
*H04L 29/08* (2006.01)
*G06Q 30/02* (2012.01)

(52) U.S. Cl.
CPC ............ *H04L 67/22* (2013.01); *G06Q 30/02* (2013.01); *G06Q 30/0242* (2013.01); *G06Q 30/0241* (2013.01); *G06Q 30/0251* (2013.01)

(58) Field of Classification Search
CPC .... H04L 67/22; G06Q 30/02; G06Q 30/0241; G06Q 30/0251; G06Q 30/0242
See application file for complete search history.

(56) References Cited

U.S. PATENT DOCUMENTS

| | | | |
|---|---|---|---|
| 9,294,577 B2 * | 3/2016 | Chamiel | H04L 67/22 |
| 2010/0198694 A1 | 8/2010 | Muthukrishnan | |
| 2010/0241506 A1 | 9/2010 | Kim | |
| 2011/0196733 A1 | 8/2011 | Li et al. | |
| 2013/0080523 A1 * | 3/2013 | Rubinstein | H04L 51/32 |
| | | | 709/204 |
| 2013/0179252 A1 * | 7/2013 | Dong | G06F 17/30873 |
| | | | 705/14.43 |

(Continued)

OTHER PUBLICATIONS

Agarwal, et al., Spatio-Temporal Models for Estimating Click-through Rate, WWW 2009 Madrid!, Apr. 20-24, 2009, pp. 21-30.

*Primary Examiner* — Kim T Nguyen
(74) *Attorney, Agent, or Firm* — Browdy and Neimark, P.L.L.C.

(57) ABSTRACT

The presently disclosed subject matter includes at least a method, system and a program storage device of estimating click through rate (CTR) of a pair of source and recommendation, the source comprising a plurality of slots, each slot configured to present a served recommendation. The CTR estimation is performed by first determining an estimated calibration CTR coefficient for each slot and then using this information for calculating an estimated CTR of a given slot when served with a given recommendation in a given source.

32 Claims, 10 Drawing Sheets

(56) References Cited

U.S. PATENT DOCUMENTS

2013/0204695 A1* 8/2013 Lee ....................... G06Q 30/00
705/14.45

* cited by examiner

CLICK THROUGH RATE ESTIMATION IN VARYING DISPLAY SITUATIONS

This application is a continuation of U.S. application Ser. No. 13/860,887 filed Aug. 11, 2013, which claims priority from U.S. provisional Application 61/622,810 filed on Apr. 11, 2012.

FIELD OF THE PRESENTLY DISCLOSED SUBJECT MATTER

This invention relates to the field of online content presentation and more specifically to the field of content recommendation.

BACKGROUND

Recommendation systems are increasingly becoming more prominent in improving online content discovery and enhancing user experience. The presentation of recommendations can be based, inter alia, on click through rate (CTR) estimation on a given recommendation. In many cases, recommendation systems are embedded within domains of dynamic nature where changes in properties of the domain may influence the performance of the recommender. For example, user interface elements within a webpage, independent of the recommender, may bias user attention and affect the probability for a click. One challenge of a recommendation system is to be able to detect these dynamic properties and perform user interaction analysis in order to avoid compromises in prediction quality.

GENERAL DESCRIPTION

According to one aspect of the presently disclosed subject matter there is provided a method of utilizing multiple slot information for estimating CTR of a recommendation for a specific source and specific slot. The method disclosed herein enables to estimate (predict) the CTR of recommendation when served (presented in a page view to a user) in the context of a specific source, in a specific slot while utilizing the data regarding the CTR of all slots associated with the same source. The method disclosed herein can be performed in an online manner as described herein.

Operations performed in accordance with the presently disclosed subject matter comprise:
  calibration process, comprising:
    (a) generating a calibration group, the calibration group comprised of only a part of the entire users and/or page views.
    (b) serving random recommendations or other recommendations that are uncorrelated to either the source or the slot on all slots presented to the calibration group; wherein random recommendations are content items which are selected randomly and presented as recommendations to a user.
    (c) For each slot, maintaining the following counters:
      maintaining a first counter (CalibrationRecommendationsCounter (slot)) which is the number of recommendations served to the calibration group on the slot (e.g. each individual recommendation can be defined as a recommendation served at a given page view);
      maintaining a second counter (CalibrationClicksCounter (slot)) which is the number of clicks on the slot, which are recorded in the calibration group;
      determining a calibration CTR coefficient (CalibrationCTR) which equals CalibrationClicksCounter (slot)/CalibrationRecommendationsCounter (slot)
    data collection process, comprising:
    (a) for a pair of (source, recommendation) (but without the slot), maintaining the following counters:
      maintaining a click-counter (ClicksCounter(source, recommendation)) which is the number of clicks on recommendation items when served in association with the source item;
      maintaining a calibrationRec-counter (CalibratedRecommendationsCounter (source, recommendation)) which is the sum of CalibrationCTR(slot) for all slots (in the source item) where a recommendation has been served, added once for each time the recommendation item was served in the slot;
    CTR Estimation process, comprising:
    (a) Estimating CTR (source, recommendation) of a given slot X as: CalibrationCTR (slot X)*ClicksCounter (source, recommendation)/CalibratedRecommendationsCounter(source, recommendation);
  Or, in other words:
  There is provided a computerized method of estimating click through rate (CTR) of a pair of source and recommendation, the source comprising a plurality of slots, each slot configured to present a served recommendation, the method comprising, with the help of a processor: performing a calibration process comprising:
    serving recommendations randomly to slots presented in page views of a calibration group; for each slot: maintaining a first counter for counting the number of recommendations which are served in a slot; maintaining a second counter for counting the number of clicks on recommendations served in the slot; determining an estimated calibration CTR coefficient for the slot based on a ratio between the first counter and the second counter; performing a data collection process, comprising: for a pair of a given source and a given recommendation, serving the given recommendation in different slots in the given source in multiple page views; maintaining a third counter for counting the number of clicks on the given recommendation when served in the given source; maintaining a fourth counter such that each time the given recommendation is served in any given slot, the CTR coefficient of the given slot is added to the fourth counter; determining an estimated CTR for the given slot based on the estimated calibration CTR coefficient of the given slot and the ratio between the fourth counter and the third counter.

According to certain embodiments of the presently disclosed subject matter, the counters described above can be updated online (e.g. for each recommendation served in the calibration group on slot X increment calibrationRecommendationsCounter(slot X) and for each click on a recommendation that was served in the calibration group on slot X increment calibrationClickCounter(slot X)) or offline.

Optionally, additional dimensions can be added in addition to the slot. For instance, the type of the source page, the section in the site the source item belongs to, the time period for which the counters are collected (e.g. hourly, daily, . . . ). for example, if on weekends a substantial increase in the number of clicks is observed, this information can be taken into consideration in order to avoid a false detection of a change in the calibration CTR coefficient. Thus, when a change in the CTR is influenced by factors other than the slot, these factors can be taken into consideration when determining the calibration CTR coefficient.

According to another aspect of the presently disclosed subject matter there is provided a method of automatic detection of UI (user interface) changes in the page layout that impact the CTR of various recommendation slots. The method disclosed herein enables to automatically detect UI changes that affect the CTR of various recommendation slots. This can include (but is not limited to) detection of changes in the placement of the various slots on the page, changes in the presentation of recommendations within a slot, addition or removal of recommendation slots and addition or removal of other UI elements on the page that can distract and/or focus the attention of users on specific recommendation slots;

Operations performed in accordance with the presently disclosed subject matter comprise:
  performing the basic calibration and data collection process—similar to the operations specified above, with the following changes:
    (a) maintaining the counters for (slot, time period) and not just for each slot, where the time period can be in a fixed time window (e.g. hourly, daily, . . . ) or variable windows (e.g. since last detected change, last week, last day, last X hours) or some form of decaying windows;
    (b) maintaining for each slot an indication of the last detected change:
      i. if a fixed time window is used (e.g. an hourly time window) then a timestamp of the last detected change per slot can be used;
      ii. if a variable time window is used (e.g. calibration counters for the last X hours, but not for every hour in the past) then a counter that accumulates the recommendations and clicks for a slot since the last detected change can be used;
    change detection, comprising:
    (a) calculating the probability function of the CalibrationCTR(slot) (or at least the first moments of that probability function i.e. mean and variance), comprising:
      i. calculating a first group of statistical moments for a recent time period (e.g. last X hours, last day, . . . );
      ii. calculating a second group of statistical moments for a time period starting from the last detected change, until the beginning of the first time period above;
      iii running a statistical test on the probability that the two periods have the same calibration, where if this probability is less than a threshold, a change is detected and one of the following options is carried out:
        A. if fixed time windows are used—the timestamp of the last detected change for the slot is updated;
        B. if variable time windows are used—the counters of the "since last detected change" are reset.

Note that the statistical test can be carried out by comparing confidence intervals (such as Wilson confidence intervals), or by doing a t-Test, or any other applicable statistical test.

Optionally, if fixed time windows are used, the following operations can be performed:
  (a) periodically (e.g. every X hours) iterating on every fixed time window from the last detected change timestamp to a recent time window;
  (b) comparing the CTR estimates (the calibration CTR coefficient as per the method above) for the following time periods: [last detected change . . . certain time in the middle] vs. [certain time in the middle . . . current time];
  the time windows in the relevant time period are divided into two groups of time windows, each group consisting of a given number of time windows; the CTR estimates in each group are summed; the summed CTR estimates of the first group are compared with the CTR estimate of the second group;

in case it is determined, with sufficiently high confidence, that the summed values in the first group and the summed values in the second group are not the same, determining an estimated time of change (e.g. resulting from a change in the slots layout in the page);
  (c) in case there are multiple timestamps that detect a change—the one that maximizes the data after the change is selected (e.g. the earliest timestamp).

CalibrationCTR Estimation after the change is detected comprising:
  (a) estimating CalibrationCTR (slot) as: CalibrationClicksCounter (slot, since last detected change)/CalibrationRecommendationsCounter (slot, since last detected change).

According to another aspect of the presently disclosed subject matter there is provided a method of estimating CTR on a slot, based on data both before and after the change. The first and second aspect described above are combined and the collection operation described with reference to the second aspect is altered as follows:
  data collection:
    for a given pair of (source, recommendation) (but without the slot), maintaining the following counters:
      (a) maintaining a CalibrationCTRCounter (slot, timestamp) for all slots and timestamps where data are processed, and this can be kept in a sparse array, thus there is no need to keep it for every timestamp, but only for those where there has been a change;
      (b) maintaining ClicksCounter(source, recommendation) which is the number of clicks on a recommendation item when served on the source item;
      (c) maintaining a CalibratedRecommendationsCounter (source, recommendation)=sum of CalibrationCTR (slot, timestamp) for all slots (in the source item) where the recommendation item was served, add once for each time the recommendation item was served in the relevant slot, at the relevant timestamp.

Or in other words:

According to certain embodiments of the presently disclosed subject matter the method further comprises:
  defining a recent time period and a previous time period; maintaining a recent first counter and a respective recent second counter for the recent time period and determining a recent estimated calibration CTR coefficient; maintaining a previous first counter and a previous recent second counter for the recent time period and determining a previous estimated calibration CTR coefficient; performing a statistical test for determining whether the recent estimated calibration CTR coefficient and the previous estimated calibration CTR coefficient are the same or not; in case it is determined, that the recent estimated calibration CTR coefficient and the previous estimated calibration CTR coefficient are not the same, determining an estimated time of change.

According to certain embodiments of the presently disclosed subject matter the method further comprises using the recent estimated calibration CTR coefficient for estimating CTR based on information obtained during the recent time period.

According to certain embodiments of the presently disclosed subject matter the method further comprises using the previous estimated calibration CTR coefficient for estimating CTR based on information obtained during the previous time period.

According to certain embodiments of the presently disclosed subject matter wherein time is divided into time windows of fixed size, the recent time period being a recent time window, and the previous time period being a previous time period.

According to certain embodiments of the presently disclosed subject matter the time is divided into time windows of fixed size, the method further comprising:

defining the previous time period as a time period from a time window of a last detected change time stamp to a given time window and defining the recent time period as a time period starting after the given time window to a recent time window.

According to certain embodiments of the presently disclosed subject matter, the method further comprises dividing the time windows multiple times, wherein, in each division, the size of the previous time period and the size of the recent time period is different; and performing the statistical test for each division until a predefined number of divisions is reached and/or until the statistical test shows a sufficient difference between the previous time period and the recent time period.

According to a further aspect of the presently disclosed subject matter there is provided a computer system comprising at least one processor associated with a computer memory being operable to execute the operation of the method described above.

According to yet a further aspect of the presently disclosed subject matter there is provided a program storage device readable by machine, tangibly embodying a program of instructions executable by the machine to perform operations of the method described above.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
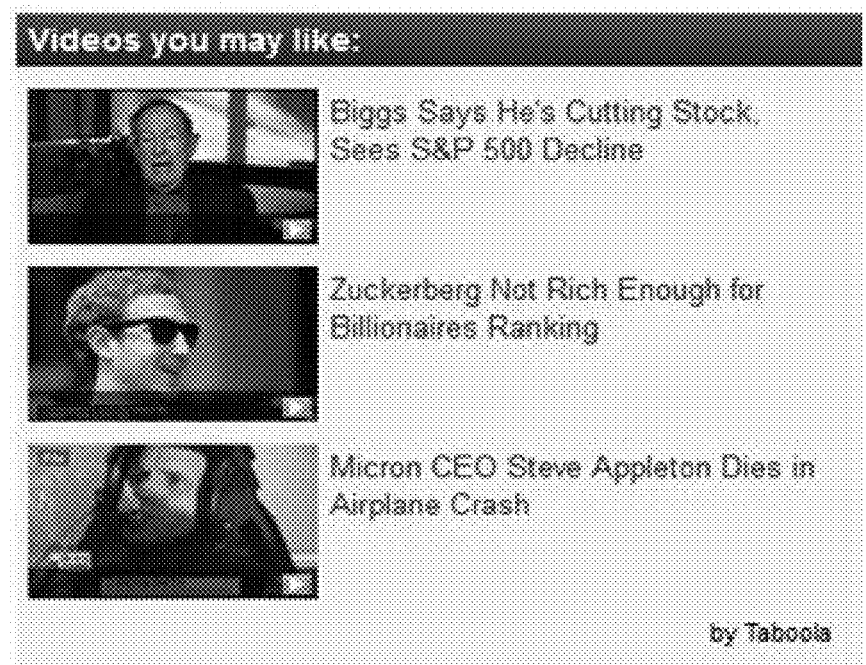
FIG. 1 shows an example of a video recommendations widget.

In the drawings and descriptions set forth, identical reference numerals indicate those components that are common to different embodiments or configurations.

As used herein, the phrase "for example," such as", for instance" and variants thereof describe non-limiting embodiments of the presently disclosed subject matter. Reference in the specification to one case", some cases", "other cases" or variants thereof means that a particular feature, structure or characteristic described in connection with the embodiment(s) is included in at least one embodiment of the presently disclosed subject matter. Thus the appearance of the phrase one case", some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

Figure 4:
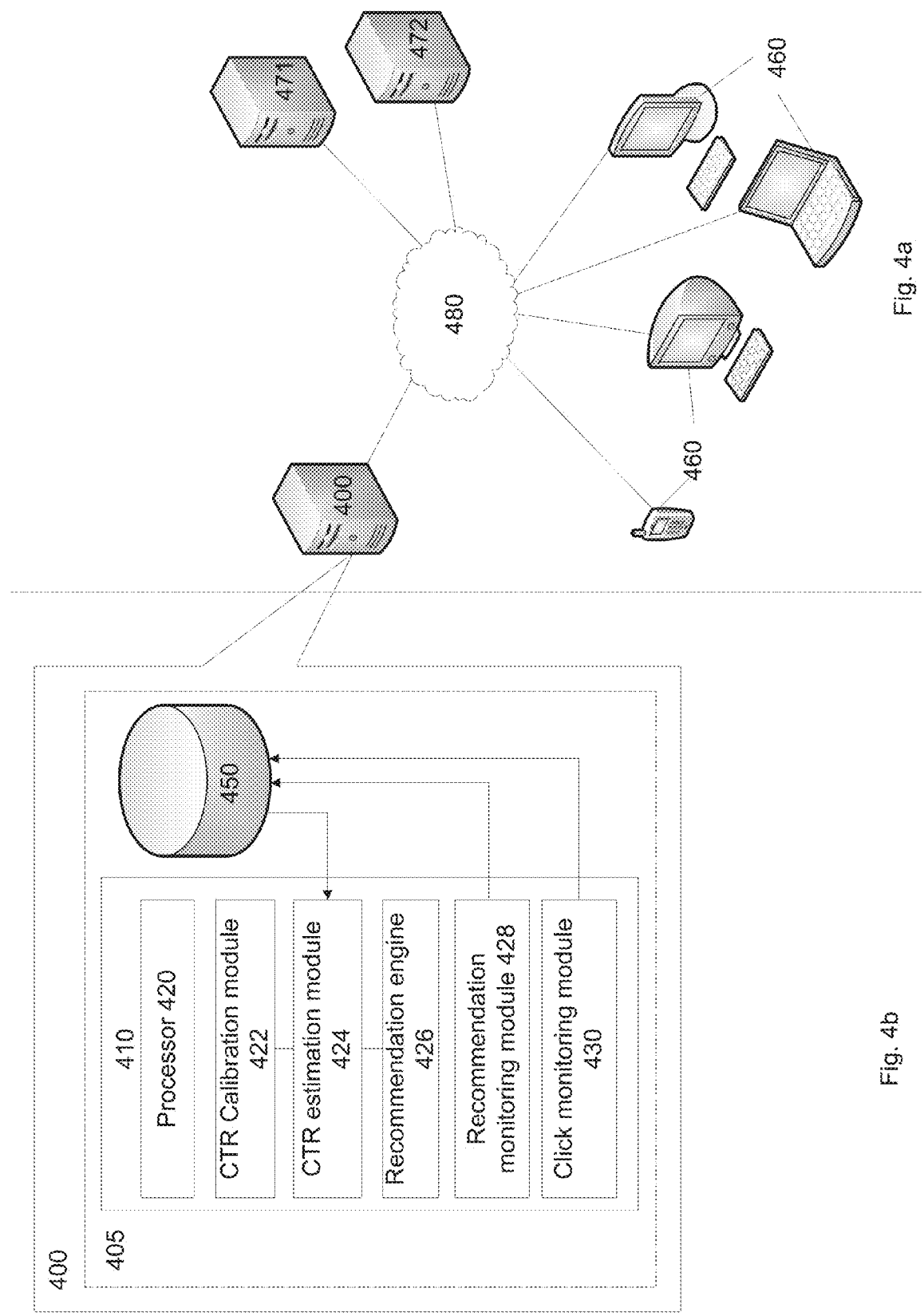
FIG. 4a and FIG. 4b are functional block diagrams schematically illustrating examples of a computer system, in accordance with the presently disclosed subject matter.
Figure 6:
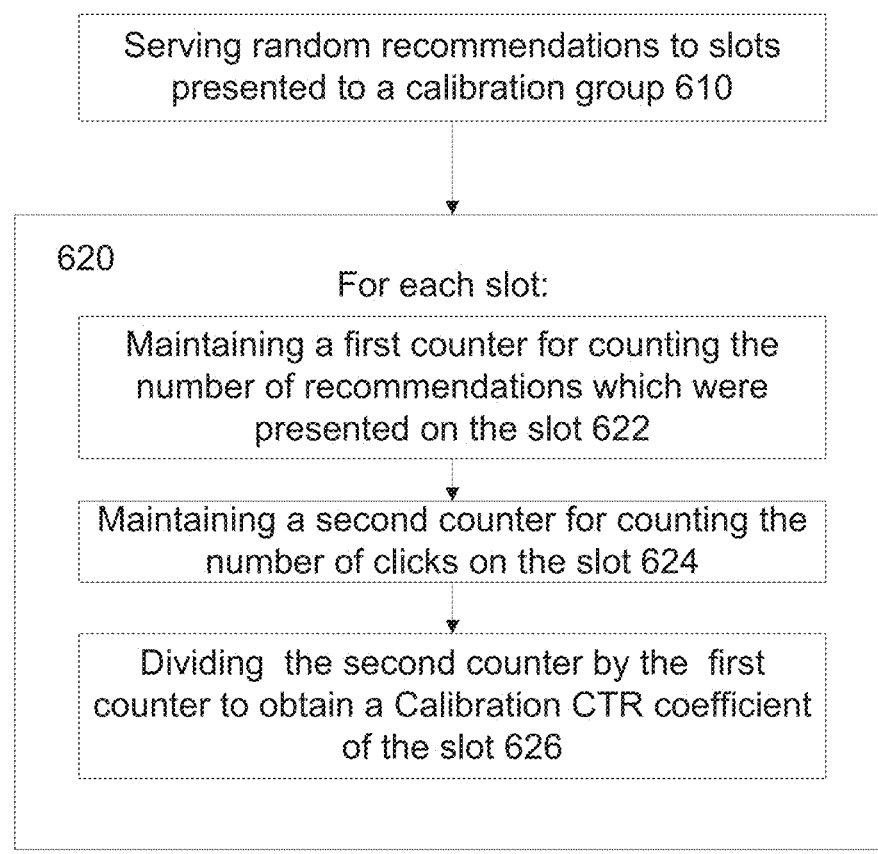
FIG. 6 is a flowchart illustrating an example of a sequence of operations carried out in a calibration process, in accordance with the presently disclosed subject matter.
Figure 7:
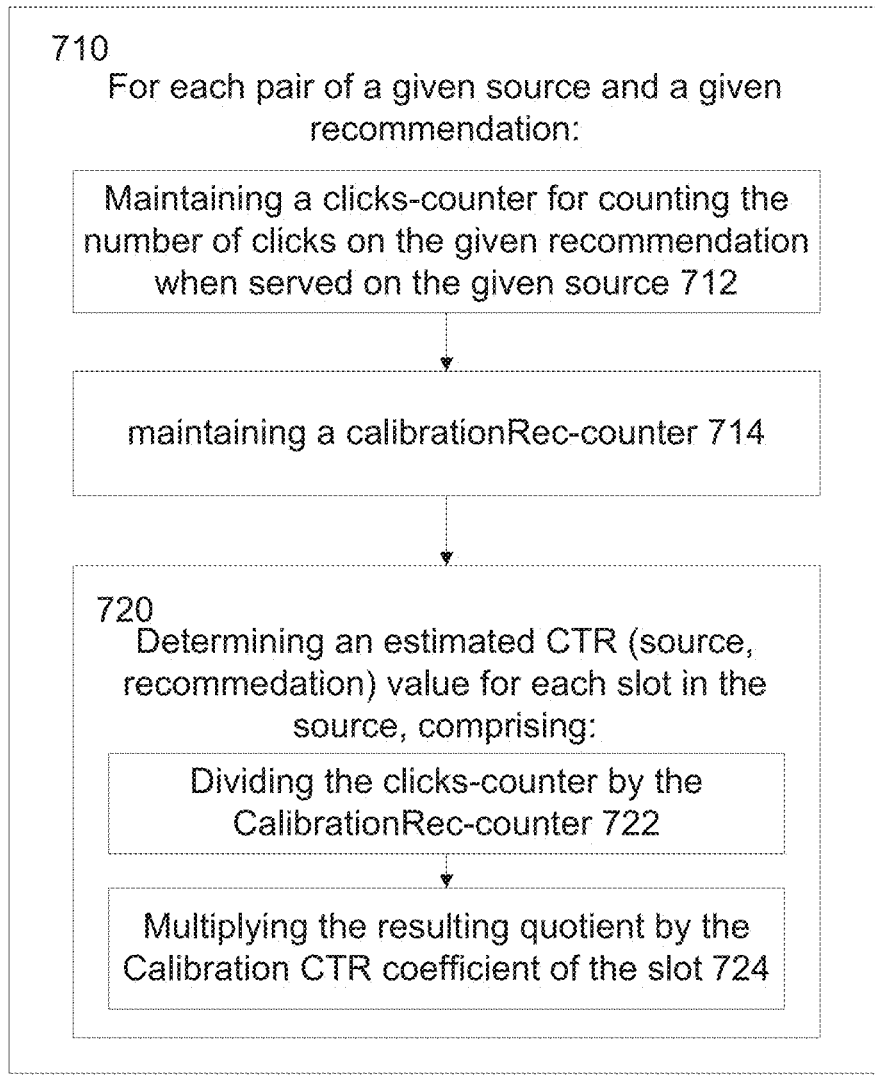
FIG. 7 is a flowchart illustrating an example of a sequence of operations carried out in a data collection process, in accordance with the presently disclosed subject matter.
Figure 9:
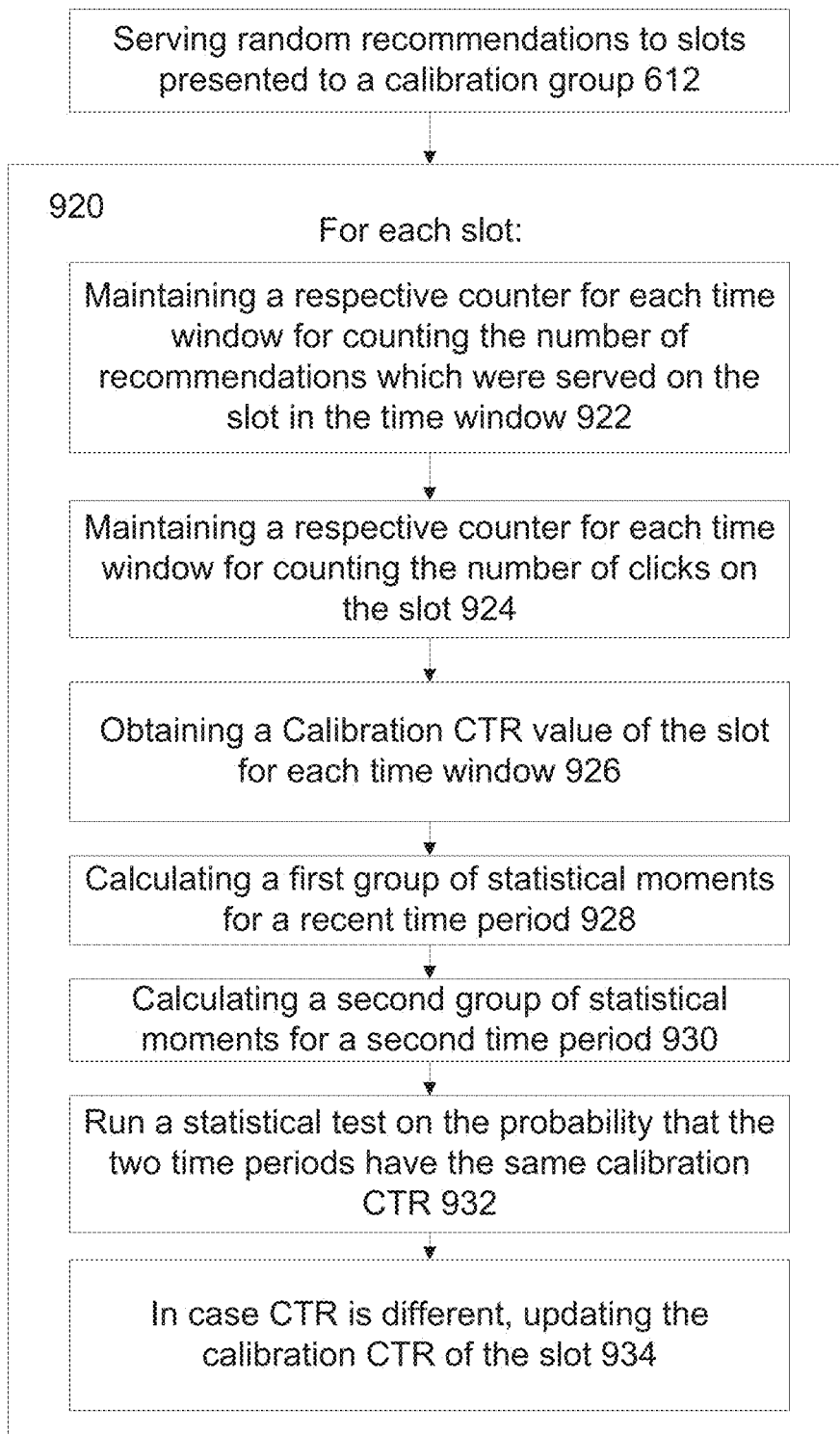
FIG. 9 is a flowchart illustrating an example of a sequence of operations carried out in accordance with the presently disclosed subject matter.

In embodiments of the presently disclosed subject matter, fewer, more and/or different stages than those shown in FIGS. 6, 7 and 9 may be executed. In embodiments of the presently disclosed subject matter one or more stages illustrated in FIGS. 6, 7 and 9 may be executed in a different order and/or one or more groups of stages may be executed simultaneously. FIG. 4a and FIG. 4b illustrate a general schematic of the system architecture in accordance with an embodiment of the presently disclosed subject matter. Each module in FIG. 4a and FIG. 4b can be made up of any combination of software, hardware and/or firmware that performs the functions as defined and explained herein. The modules in FIG. 4a and FIG. 4b may be centralized in one location or dispersed over more than one location. In other embodiments of the presently disclosed subject matter, the system may comprise fewer, more, and/or different modules than those shown in FIG. 4a and FIG. 4b.

The term "source" (or source item) as used herein includes the content item the user is currently consuming (e.g. an article displayed on a web page currently viewed by a user or a video displayed on a webpage currently viewed by a user, etc.).

The term "recommendation" (or recommended item) as used herein includes data which is being displayed as a recommendation while the user is consuming the source item (including for example, content such as a video, an article, a link, a banner, etc.).

The term "recommendation widget" as used herein includes a location in a page (webpage) designated for placing recommendations. The term "slot" includes a location within the recommendation widget where a single recommendation may be displayed. A single page can have multiple recommendation widgets and a single widget may consist of multiple recommendation slots. The presently disclosed subject matter includes methods for dealing with the challenges in recommendation systems related to click through rate (CTR) estimation. In addition, the subject matter disclosed herein shows how to perform CTR estimations in conditions of changes in page layout and limited memory.

In recent years, content discovery has become one of the main interests for online content sites. Companies such as the Applicant (Taboola), develop generic recommendation engines which are plugged into websites, so as to learn and classify their content and observe user behavior on the site in order to present the user with recommendations of new content which they may find of interest. One example is the recommendation of video content, a medium which is increasingly becoming more popular and which offers a more engaging user experience compared to text articles. FIG. 1 shows an example of the Applicant's video recommendations widget (otherwise referred to as "component"). FIG. 1 shows an example of a vertical recommendation widget, which consists of three recommendation slots and which can be embedded in a source item (e.g. web page).

Figure 2:
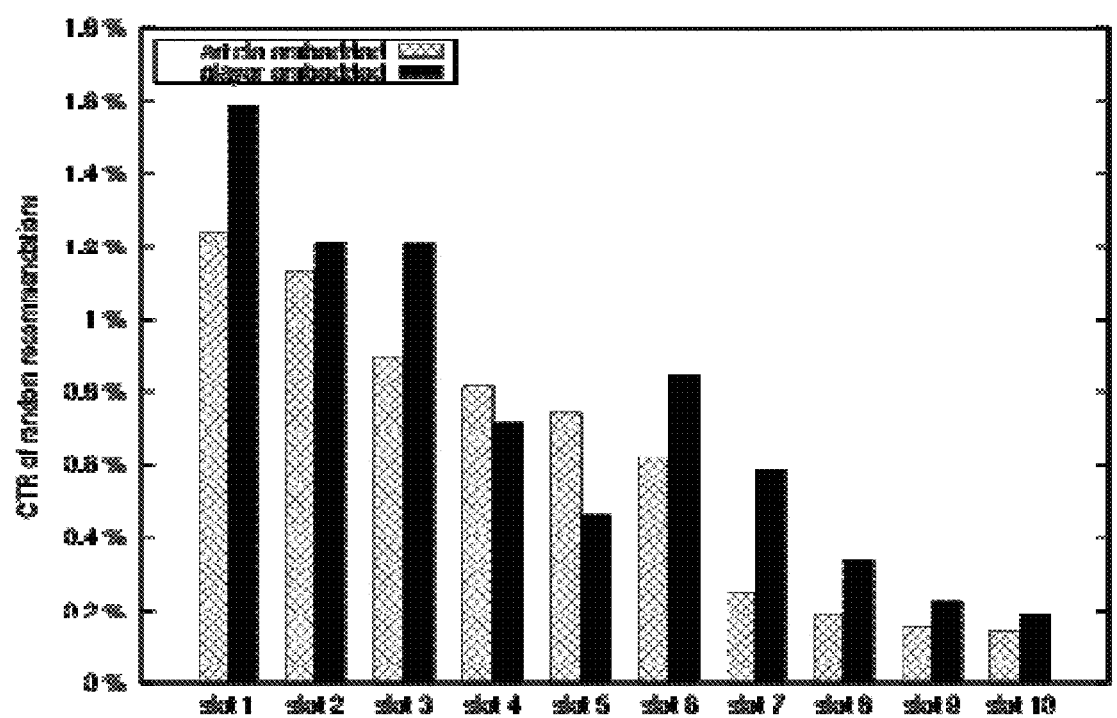
FIG. 2 is a diagram showing the CTR of random recommendations displayed in different recommendation slots in two recommendation widgets.

Click through rate (CTR) estimation is a basic module in a recommendation system. Recommendation items are presented to the user next to the content items the user is currently viewing. The recommendations are presented in different situations referred to as display setups, for example:

Recommendations may be displayed in different positions within the recommendation list (referred to herein as slots). If the user did not click on a recommendation which was displayed at the bottom slot of a vertical recommendation list, it would probably be less indicative of dissatisfaction than the same response to a recommendation which was shown in the top slot. FIG. 2 is a diagram showing the CTR of random recommendations displayed in different recommendation slots in two recommendation widgets: one is placed on the page to the right of a video player, and the other is embedded within a video player (black columns). As shown in FIG. 2, users click more on recommendations which are embedded within the video player and shown after the video ends. Also note that the CTR distribution is not necessarily monotonic.

In some recommendation systems, the recommendation list may also contain ads or sponsored videos displayed alongside the recommendations. In such situations, some users may ignore nearby recommendations in such a list due to "ads blindness".

Recommendation components can be embedded within the site web pages. The layout of these pages may be changed over time by the site staff without notifying the recommendation system. These changes may include the recommendation component placement, size, title, colors and so on. These changes, as well as any other changes in the page, may affect the users' interaction with the recommendations component.

In the context of this disclosure, the term source is used to refer to the content item a user is currently viewing, and the term recommendation items is used to refer to content items recommended within that context.

In order to estimate the CTR of a recommendation when it is displayed next to a given source item, the estimation module should properly account for the different situations in which this recommendation was displayed in the past. For example, suppose a recommendation $r_1$ was served 300 times in the third slot next to an ad and it was clicked 10 times. Suppose now that the site staff changed the page and the recommendation component (slot) was now shifted to the right-hand side of the page. In the new page layout, another recommendation $r_2$ was served 300 times, this time in the first slot, and was clicked 20 times. When estimating CTR for $r_1$ and $r_2$ and ranking them by their expected performance, it would be advantageous to take into account the different situations in which these measurements were taken.

The teaching disclosed herein provides some advantages, including:

Realtime: new input on user behavior is reflected in the recommendations CTR estimate as fast as possible Online algorithm: the estimation module can be operable to process its input in a serial fashion, iterating over the recommendation logs only once and immediately after the logs are created.

Memory efficiency: the proposed system and method can be operable to use less memory for each pair of recommendation and source items (as compared to other prior art methods), in particular, it is not necessary to hold separate counters for each display setup.

Support heavy tail sites: an important segment of sites are those that have many views on the whole site but are not concentrated on a small group of source items. These sites have many items where each item gets only a few views each week. For example, some how-to sites show that 80% of the views are on source items, each viewed only around 50 times a month. This requirement rules out solutions which attempts to determine weights for the different slots for every recommendation separately. This type of solution is described in the Proceedings of the 18th International Conference on the World Wide Web, ACM (2009) 21-30, in the article by Agarwal, D., Chen, B., Elango, P., entitled *Spatio-temporal models for estimating click-through rate*. Indeed, their solution is feasible for recommendations in a popular homepage, but is less appropriate for heavy tailed sites.

Figure 3:
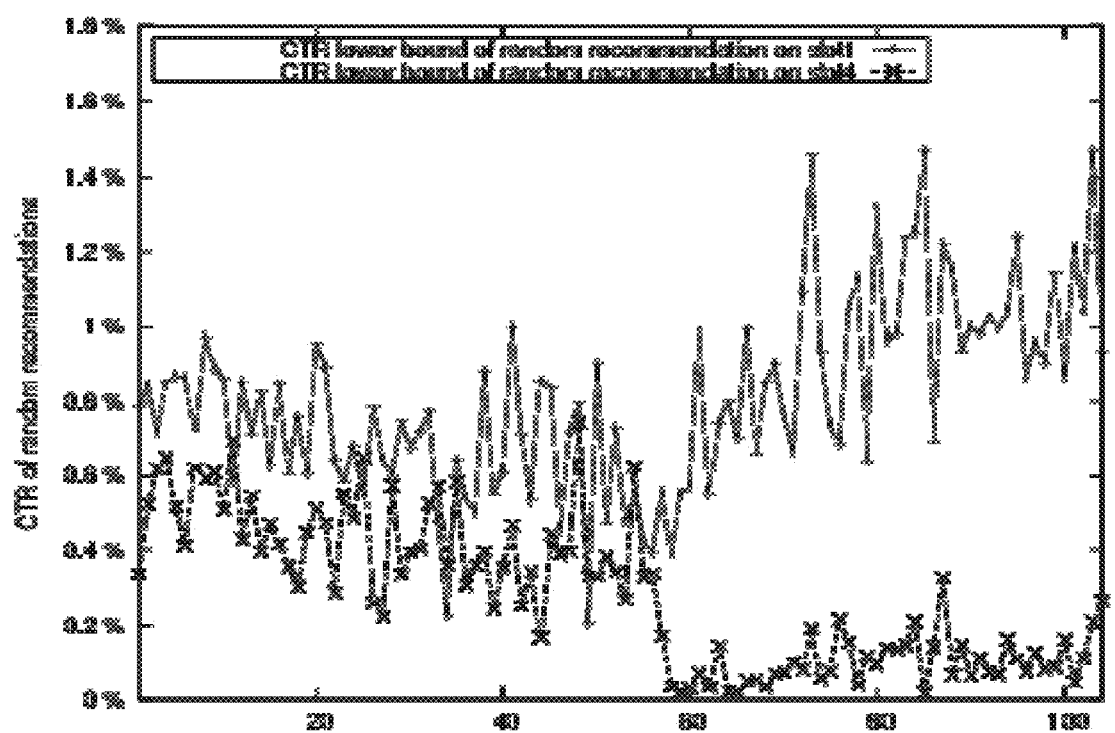
FIG. 3 is a diagram showing an example of the CTR of random recommendations in slot 1 and 4 of a recommendation widget.

Fast detection of changes in the sites pages: when the site staff changes page layout, the system should detect this change quickly in order to correctly account for the clicks information. For example, one of the sites which was monitored by the presently disclosed system made a change to the page, such that the applicants recommendation widget was brought up on the page, which increased the CTR for the top slots, and also introduced an ad banner, in close proximity to slot 4 in the recommendation widget. FIG. 3 is a diagram showing the CTR of random recommendations in two different slots (in this case slot 1 and slot 4) of the recommendation widget. As can be seen in FIG. 3 a significant step-change CTR drop occurred in slot 4 (the bottom line) and an increase in CTR occurred in slot 1 (the upper line).

Furthermore, changes in a user interface may greatly influence CTR. A recommendation system should be able to detect any changes in CTR behavior in order to perform informed predictions, as shown herein.

Attention is now drawn to FIG. 4*a* and FIG. 4*b*, illustrating functional block diagrams schematically illustrating one example of a computer system, in accordance with the presently disclosed subject matter. System 400 is configured in general to provide recommendation of alternative content (e.g. articles, videos, other URLs, etc.) to a user (or viewers) of a source item. The source items include, for example general pages (such as a home page, section fronts, search result pages, etc.) or other pieces of content of a website (such as articles, photo galleries, video players, product pages, etc.) in which a recommendation can be served.

According to one example, system 405, which is implemented in device (server) 400 can be connected over a network 480 to one or more publisher servers (471, 472) and provide to the publishers information regarding recommendations. The publisher servers can then provide the recommendation to client devices 460 connected to the publisher servers over the network together with content (e.g. web pages) requested by the user of the client device.

According to another example, client devices 460 can be directly connected (e.g. via network 180) to system 405. Content, such as web pages, which is downloaded by the client devices, includes a piece of code (e.g. Java script, Flash etc.) which is executed on the client device and invokes system 405 when a user is viewing the web page. In this scenario, recommendations are directly provided by system 405 to the client device.

System 400 is configured, inter alia, to monitor the behavior of the users while watching the source items and provide recommendations i.e. suggest content to be provided as recommendations to a viewer of a source item. According to the presently disclosed subject matter system 400 is configured, inter alia, to determine an estimated CTR for a given slot in a given source when serving a given recommendation in the slot.

FIG. 4b, an enlarged view of FIG. 4a, provides an example of a more detailed view of system 400. System 400 comprises a recommendation subsystem 405 comprising a processor 420 and a computer memory including: a CTR calibration module 422 configured to perform the calibration stage and determine a calibration CTR coefficient for each slot in a given source; a CTR estimation module is configured to determine an estimated CTR for a pair of a given source and a given recommendation served in a given slot.

System 400 also comprises a recommendation monitoring module 428 configured to monitor the recommendation which is served at the publisher's website and click monitoring module 430 to monitor the clicks on the recommendation which is served at the publisher's website. Information collected by monitoring modules 428 and 430 can be stored in a data-repository 450, which can be configured as an integral part of system 400, or can be located at another location and connected to system 400 over a communication network.

System 400 further comprises a recommendation engine 426 (e.g. the Applicant's recommendation facility) for recommending content to users who are viewing a source item. The recommendation engine can make use of the estimated CTR when determining whether or not to serve a given recommendation in a given slot of a given source. According to other examples, recommendation engine 426 can be located at a different device (e.g. different server computer) and communicate with system 400 over a network in order to obtain estimate CTR information.

A more detailed description of the operations which are performed by system 400 in accordance with the presently disclosed subject matter are described below with reference to FIGS. 5 to 10.

According to one example, the probability $P(c|s,r,d)$ for a click on a recommendation r presented in a display setup d (d representing a slot in the Applicant's widget) when the user is watching the source item s, is estimated. To this end, a two stage model can be assumed where in the first stage it is decided in a binomial trial whether the user will examine the recommendation or not. The result of the first stage depends on the display setup and is independent of the recommendation or the source item. If the outcome of the first stage is positive (i.e. the user has examined the recommendation), only then the user will click or not click on the recommendation: another binomial trial is conducted where the outcome depends on the recommendation and the source item, but not on the location of the slot and its relation to other components in the page.

Figure 5:
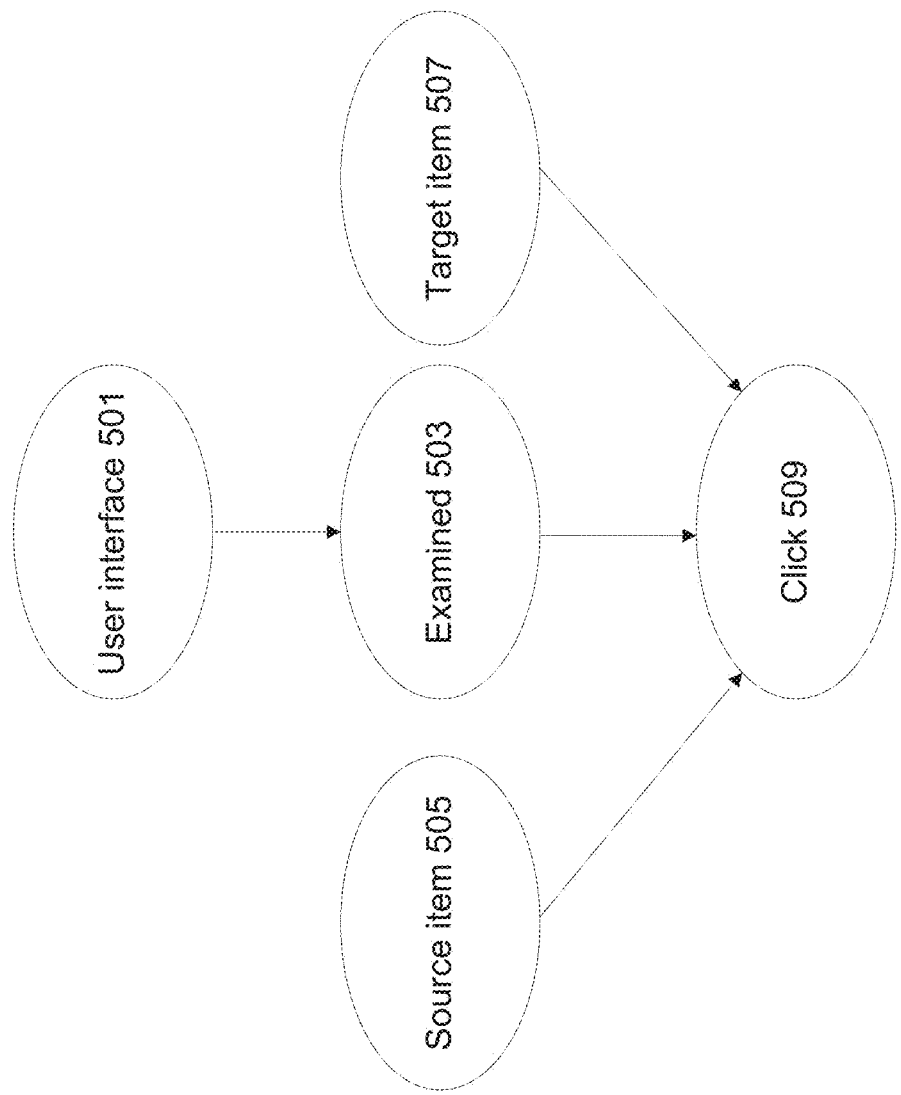
FIG. 5 is a probabilistic graphical representation of CTR inference model, in accordance with the presently disclosed subject matter.

FIG. 5 is a probabilistic graphical representation of a CTR inference model, in accordance with the presently disclosed subject matter. As shown in FIG. 5 the probability for a click on a target item (recommendation) in a specific user interface is viewed as a two-step estimation problem, where the probability is first established for the user to examine the recommendation in that user interface, and then, given that the user examined the recommendation, estimate the probability for a click in the context of the item the user is currently viewing (source item).

To accommodate this model, a latent boolean variable e and factor $P(c|s,r,d)$ are introduced as follows:

$$P(c|s,r,d) = P(c|s,r,e)P(e|d) + \qquad (1)$$
$$P(c|s,r,\bar{e})P(\bar{e}|d)$$
$$= P(c|s,r,e)P(e|d)$$

According to this example $P(c|s,r,e)$ is assumed to be stationary. This is a reasonable assumption for many cases, specifically, but not exclusively, for sites with "evergreen" content (i.e. content such as how-to videos, and articles that are of interest to viewers over a long time period, as opposed to current events content, which has a short duration of interest), as well as sites with a very short lifetime, such as news sites. Also, the scope of the presently disclosed subject matter combines information from the different situations in which the recommendation was displayed, and the temporal change of $P(c|s,r,e)$ can be handled orthogonally to the methods presented here. Note, as explained in more detail below, it is assumed that $P(e|d)$ can change over time.

According to the presently disclosed subject matter, probability $P(e|d)$ that a user examines a recommendation, given a specific display setup, is estimate first. This phase is referred to herein as the calibration process. Actually, $P(e|d)$ is estimated up to multiplication by a constant $\alpha$ which does not depend on the display setup.

FIG. 6 is a flowchart illustrating an example of a sequence of operations carried out during the calibration process, in accordance with the presently disclosed subject matter. Operations described with reference to FIG. 6 can be performed for example by system 405 (e.g. with the help of CTR calibration module 422).

At block 610 a calibration group (or calibration bucket) is served with recommendations. The calibration group comprises a part of the entire population of viewer and/or page views of a given source. For example, the calibration group can consist of a predefined percentage of the entire population of viewers and/or page views of a given source. Optionally, the calibration group can be characterized by varying size. For example, when a website is initially launched, the calibration group can consist of a greater percentage (e.g. 10%) of the population of viewer and/or page views, and after a certain time the percentage can be reduced (e.g. 2%). Note, that while a greater percentage would provide more accurate CTR estimation, it presents a greater computational load on the system. Recommendations which are being served to the calibration group during the calibration process, are monitored.

In order to estimate P(e|d), recommendation served to the calibration group are random recommendations, which are neither dependent on the source, nor on the display setup, to a group of users, referred to herein as a calibration bucket. The probability for a click on a random recommendation depends on the location of the slot in which they are presented.

One example of a way of selecting the calibration group can include randomly selecting part of all page views (of all visitors viewing all sources). Another example of a way of selecting the calibration group can include randomly selecting some of all viewers (based on traits such as their IP address or a cookie), and then selecting all page views by these viewers.

For each user display setup (for example, some slot in a recommendation box which appears under a text article), the number of times a recommendation was served $N_r^d$ is collected, as well as the number of times it was clicked $N_c^d$.

At block 622 a first counter ($N_r^d$) is maintained for counting the number of recommendations which were presented on the slot. At block 624 a second counter ($N_c^d$) is maintained for counting the number of clicks on the slot. These operations are performed for each slot in the source item.

At block 626, the probability for a click given a specific display setup is estimated by:

$$\hat{P}(c|d) = N_c^d / N_r^d \quad (2)$$

From the derivative above, the following is obtained:

$$P(c|d) = \sum_{s,r} P(s,r) P(c|s,r,d) \quad (3)$$
$$= \sum_{s,r} P(s,r) P(c|s,r,e) P(e|d)$$
$$= P(e|d) \sum_{s,r} P(s,r) P(c|s,r,e)$$

the following can be defined:

$$\alpha = \sum_{s,r} P(s,r) P(c|s,r,e) \quad (4)$$

Since the recommendations in the calibration bucket do not depend on the source or the UI, α does not depend on d. Note that α will change over time if the mixture of watched sources changes. In some domains, for example how-to websites, it is reasonable to assume that this mixture will change slowly over time and to this end it is assumed that α is constant over time.

The following is now obtained:

$$P(c|d) = \alpha \cdot P(e|d) \quad (5)$$

From Equations 2 and 3, the estimation for P(e|d) may be written as follows:

$$\hat{P}(e|d) = \frac{1}{\alpha} \cdot \hat{P}(c|d) = \frac{1}{\alpha} \cdot N_c^d / N_r^d \quad (6)$$

Note that, as explained below, it is not necessary to know α explicitly and this will be cancelled out when the estimations are derived.

The calibration process continues until sufficient information is collected (e.g. sufficient number of clicks). Thus, the calibration time period is dependent on the amount of traffic. Optionally, the calibration process can be terminated based on a predetermined binomial error level.

The presently disclosed subject matter further provides a method for estimating, in an incremental manner, that smoothly reflects temporal changes in P(e|d) as they occur. Furthermore a confidence interval is derived for this estimation.

FIG. 7 is a flowchart illustrating an example of a sequence of operations carried out during the data tracking process, in accordance with the presently disclosed subject matter. Operations described with reference to FIG. 7 can be performed by system 405 (e.g. with the help of CTR estimation module 622). Operations described with reference to FIG. 7 enable to determine an estimated CTR of a given recommendation when served in a given slot of a given source.

As illustrated in FIG. 7 for a pair of a given source and given recommendation, the following operations can be performed: a counter (click-counter) for counting the number of clicks on the given recommendation when served on the given source is maintained (block 712). Another counter (CalibrationRec-counter) is maintained, for which, each time the given recommendation is served in any given slot, the CTR coefficient of the given slot is added to the CalibrationRec-counter (block 714). Note, that as mentioned above during the data collection process, it is not necessary to maintain counters for each slot separately.

According to one example information regarding the clicks made on a given recommendation is obtained by click monitoring module 430 and information regarding the recommendations which are served in a given source is obtained by recommendation monitoring module 428. Information which is obtained by these units can be stored in data-repository 150.

From the observation (observation is the collection of information with respect to the presentation of a given recommendation and clicks on the served recommendation in a given page view), $N_c^{s,r}$ clicks out of $N_r^{s,r}$ recommendations are obtained. Following the two-stage model, the expected number of clicks is $$\sum_{i=1}^{N_r^{s,r}} P(e|d_i) \cdot p$$

where $d_i$ is the display setup of ith observation. Following the method of moments, p will be estimated by setting the expected number of clicks to be equal to the observed number of clicks, and thus obtaining $$\hat{p} = \frac{N_c^{s,r}}{\sum_{i=1}^{N_r^{s,r}} P(e|d_i)}$$

By Equation 6 the following is obtained:

$$\hat{p} = \frac{N_c^{s,r}}{\sum_{i=1}^{N_r^{s,r}} \frac{1}{\alpha} \cdot P(c|d_i)} \quad (8)$$

At block 720 the estimated CTR for a given source and given recommendation for each slot in the source is calculated. The click-counter is divided by the CalibrationReccounter (block 732) and multiplied by the Calibration CTR coefficient of the slot (block 734).

By equation 1 the probability for a click in a particular display setup d is estimated by $$\hat{P}(c \mid s, r, d) = \hat{p} \cdot P(e \mid d) \quad (9)$$

$$= \frac{N_c^{s,r}}{\sum_{i=1}^{N_r^{s,r}} \frac{1}{\alpha} \cdot P(c \mid d_i)} \cdot \frac{1}{\alpha} \cdot P(c \mid d)$$

$$= \frac{N_c^{s,r}}{\sum_{i=1}^{N_r^{s,r}} P(c \mid d_i)} P(c \mid d)$$

A major advantage in estimating CTR using this method is its compact memory representation: in order to maintain this estimation for a source/recommendation pair two counters need to be maintained:

The number of clicks for the pair

The sum of P(c|d) in the calibration group for the display setup in which the recommendation was presented.

In order to translate these counters into a confidence interval, it is noted that the standard deviation of the estimator is:

$$\sigma(p) = \sqrt{\frac{p \cdot \sum_{i=1}^{N_r^{s,r}} (P(c \mid d_i) - p \cdot P(c \mid d_i)^2)}{\left(\sum_{i=1}^{N_r^{s,r}} P(c \mid d_i)\right)^2}} \quad (10)$$

Similarly to Wilson's confidence interval derivation [4], an upper bound and lower bound of the confidence interval is taken to be the root of the following quadratic equation:

$$|p - \hat{p}| = k \cdot \sigma(p) \quad (11)$$

where k is a confidence parameter.

In addition to being computationally attractive, there are a few conceptual differences between the CTR estimation presented here, and other estimation methods which are known in the art (e.g. maximum likelihood estimation). In particular, unlike the maximum likelihood estimation, this method does take into account the display setups where clicks have occurred. Given two slots, a first slot with an estimated CTR coefficient which is greater than the estimate CTR coefficient of the second slot, the method disclosed herein provides greater weight to clicks on recommendations served in the second slot, than clicks on recommendations served in the first slot.

Figure 8:
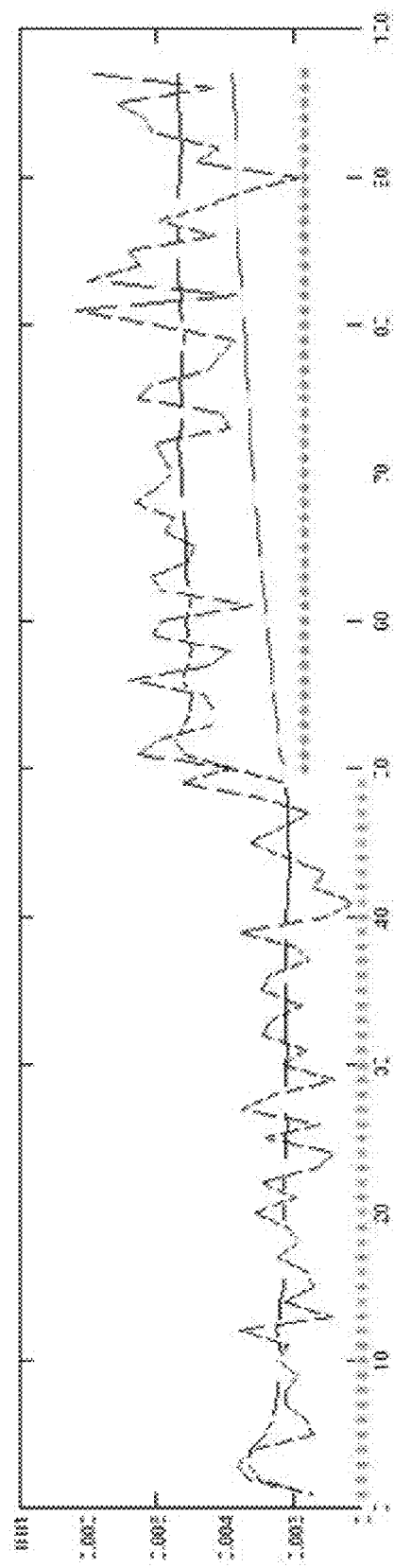
FIG. 8 is a chart showing a comparison of change detection methods, in accordance with the presently disclosed subject matter.

FIG. 3 above shows a real-life case where the hosting website made direct changes to the recommendation component placement and dimensions. One way to deal with temporal changes in CTR is by simultaneously decaying older information. While this may be a good way to deal with more subtle changes, in the current case changes often have a step-change behavior. After such change has been detected, all information preceeding the change, should be ignored. For example, FIG. 8 shows CTR calibration data for some user interfaces obtained over several weeks of traffic in the Applicant's system. Note how at point 50 a substantial lift in calibration CTR is experienced, resulting from a change in a user interface. A method of change detection with a decay over calibration CTR (the lower solid line) is compared with a method that detects a step change and ignores previous information (the upper solid line) as disclosed herein. Clearly, the second method better tracks the real CTR.

FIG. 9 is a flowchart illustrating an example of a sequence of operations carried out for determining a change in calibration CTR, in accordance with the presently disclosed subject matter. Operations described with reference to FIG. 9 can be performed by system 405 (e.g. with the help of CTR calibration module 422 and CTR estimation module 424).

The operations described with reference to block 610 were described earlier with reference to FIG. 6. For each slot, a respective counter is maintained for each time window, for counting the number of recommendations, which were served on the slot in the time window (block 922) as well as a respective counter for each time window for counting the number of clicks on the slot (block 924). Based on this information, a calibration CTR value of the slot is obtained for each time window (block 926).

In order to adapt to temporal changes, Equation 9 is re-written as follows:

$$\hat{P}(c \mid s, r, d, t) = \frac{N_c^{s,r}}{\sum_{i=1}^{N_r^{s,r}} P_{t_i}(e \mid d_i)} P_t(e \mid d) \quad (12)$$

where $t_i$ is the time when the recommendation was served (as collected from user interaction data) and t is the time of estimation. In case a change occurs after CTR information is accumulated for a pair, this information is still relevant, as it encapsulates the probability for the user interface to be examined by the user at the time of recommendation. Observations made before the detected change are processed using the calibration CTR coefficient calculated for the time period before the change and observations made after the detected change are processed using the calibration CTR coefficient calculated for the time period after the change. It can be added that the ability to correctly account observations from different times, before and after UI change, stems from not maintaining a normalized sum.

How to estimate $P_t$ (e|d) for any t will now be described. According to one non-limiting example, this can be accomplished with the help of a change detection method for a given d based on sliding windows. Let $t_a$ be the hour of the previous change and let $t_b$ be the current hour. All $t_l$ are reviewed, such that a≤l≤b: let $k_1, n_1$ is the number of clicks and recommendations in the calibration group at times $t_a$ . . . $t_l$ and $k_2, n_2$ is the number of clicks and recommendations in the calibration group at times $t_l + 1$ . . . $t_b$.

At block 928 a first group of statistical moments is calculated for the first (e.g. recent) time period e.g. $t_l + 1$ . . . $t_b$ and at block 930 a second group of statistical moments is calculated for the second (previous) time period e.g. $t_a$ . . . $t_l$.

A statistical test is performed for the $H_0: p_1 = p_2$ (block 932). If $H_0$ is rejected with high confidence, $t_l$ can be declared as a point of change and all data before $t_l$ may be ignored when estimating $P_t$ (e|d) for $t > t_l$.

To test $H_0$ a two Wilson confidence interval with lower bounds $lb_1, lb_2$ and upper bounds $ub_1, ub_2$ of size $z_{1-\alpha 2}$ is established, so that an overlapping confidence interval test can be performed. Note that because a test is performed for any intermediate hour $t_i$, $\alpha$ is not the real confidence level for the test and it should be empirically adjusted. Two additional parameters, $\lambda$ and $\epsilon$, can be used in order to ensure statistical significance. It is required that $n_1 > \lambda$ and $n_2 > \lambda$, that is, it is required that both windows be based on a sufficient amount of trials (for example, set $\lambda = 1000$). Furthermore, the disclosed method attempts to detect a change as soon as it has confidently occurred. Once a point of change is found, the CTR calibration estimation can be changed to be the mean of the newly discovered one (block 934). In order to avoid a noisy estimation, the relative error of the new estimation is measured while it is required that it will not exceed $\epsilon$. If the relative error exceeds $\epsilon$, the calibration group size can be temporarily increased, until more information is collected.

Figure 10:
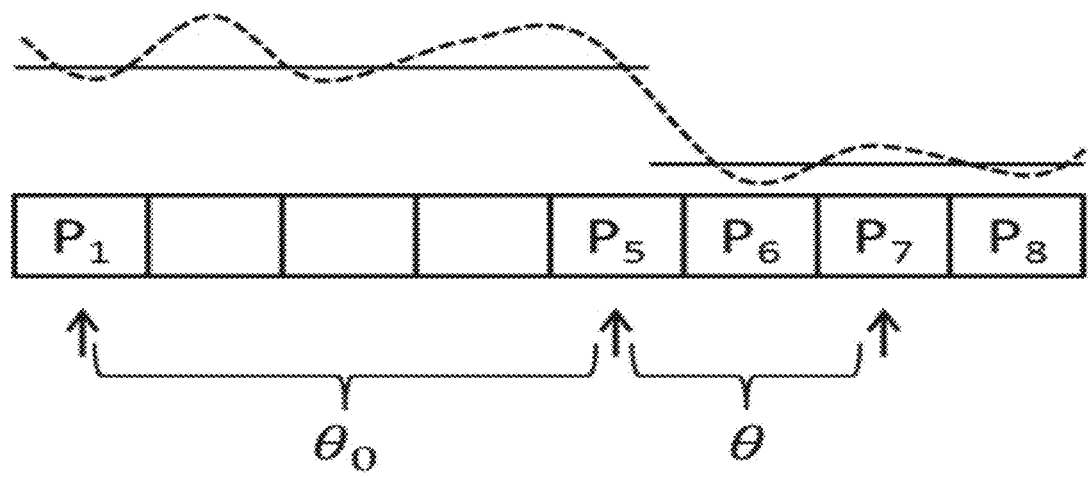
FIG. 10 is a schematic illustration of an example of change detection using sliding windows, in accordance with the presently disclosed subject matter.

FIG. 10 is a schematic illustration of an example of change detection using sliding windows, in accordance with the presently disclosed subject matter. The process in FIG. 10 is illustrated as follows: suppose there was a change in user interface after point t=5. An increasingly larger period is observed and $w_1$, $w_2$ is constructed by dividing this period into two disjoint periods and comparing their corresponding CTR estimations. For example, the period $P_1 \ldots P_6$ can be divided into two windows $w_1$ consisting of data $P_1 \ldots P_5$ and $w_2$ consisting of $P_6$. In case it can be deduced that their estimations are statistically different, it can be concluded that change occurred and the estimation based on $w_2$ may be taken as the new CTR calibration. In this example, variability for $w_2$ was too high to be able to make this inference, and only when the $w_2$ was increased to include information from $P_7$ an informed change detection decision was made.

Unless specifically stated otherwise, as apparent from the following discussions, it is appreciated that throughout the specification discussions utilizing terms such as "serving", "maintaining", "determining", "performing" or the like, include actions and/or processes of a computer processing unit that manipulate and/or transform data into other data, said data represented as physical quantities, e.g. such as electronic quantities, and/or said data representing the physical objects. The term "processing unit" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

It will also be understood that the system according to the presently disclosed subject matter may be a suitably programmed computer including a computer specially constructed for the desired purposes and/or a general purpose computer specially configured for the desired purpose by a computer program stored in a computer readable storage medium. The presently disclosed subject matter further contemplates a processing unit comprising at least one processor associated with non-transitory computer memory, which is operable for executing operations as described above. The term "non-transitory" is used herein to exclude transitory, propagating signals, but to otherwise include any volatile or non-volatile computer memory technology suitable to the application.

Likewise, the presently disclosed subject matter contemplates a computer program being readable by a computer for executing the method of the presently disclosed subject matter. The presently disclosed subject matter further contemplates a machine-readable non-transitory memory tangibly embodying a program of instructions executable by the machine for executing the method of the presently disclosed subject matter.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A computer implemented method of estimating click through rate (CTR) of a recommendation, the recommendation is presented in at least one source; the source comprising a plurality of slots, each slot configured to present a served recommendation; wherein a computer on which the method is implemented comprises at least one processor and is operatively connected to a data repository; the method comprising causing the computer to implement the steps of:
performing a data collection process, comprising:
for a given recommendation, serving the given recommendation in multiple page views in different slots of one or more sources;
maintaining in the data repository a respective first data collection counter for counting a number of clicks on the given recommendation when served in any one of the one or more sources;
maintaining in the data repository a respective second data collection counter such that each time the given recommendation is served in any given slot of any one of the one or more sources, an estimated calibration CTR coefficient of the given slot is added to the second data collection counter;
wherein the estimated calibration CTR coefficient is a value assigned to each slot presented in page views of a calibration group, wherein slots in the calibration group are served randomly with recommendations;
the estimated calibration CTR coefficient is based on a ratio between a first calibration counter and a second calibration counter; the first calibration counter counting a number of recommendations which are served randomly in a slot being part of the calibration group and the second calibration counter counting a number of clicks on the recommendations served in the slot;
wherein during the data collection process, serving the recommendation in one or more sources, each source having one or more slots, does not increase a number of the first data collection counters and a number of the second data collection counters assigned to each recommendation; and
determining an estimated CTR of the given recommendation in all served slots based on a ratio between the second data collection counter and the first data collection counter.

2. The method according to claim 1, further comprising:
determining an estimated CTR of the given recommendation when served in a certain slot based on an estimated calibration CTR coefficient of the certain slot and the estimate CTR of the given recommendation in all served slots.

3. The method according to claim 1, further comprising performing a calibration process comprising:
  serving recommendations randomly to slots presented in page views of the calibration group;
  for each slot:
    monitoring the served recommendations on the slot and maintaining the first counter for counting the number of recommendations which are served in a slot;
    monitoring clicks on the slot and maintaining the second calibration counter for counting the number of clicks on recommendations served in the slot; and
    determining an estimated calibration CTR coefficient for the slot based on the ratio between the first calibration counter and the second calibration counter.

4. The method according to claim 3, wherein the estimated calibration CTR coefficient is determined while taking into consideration additional information which influence the number of clicks on the slot.

5. The method according to claim 3, further comprising:
  defining a recent time period and a previous time period;
  maintaining a recent first calibration counter and a respective recent second calibration counter for the recent time period and determining a recent estimated calibration CTR coefficient;
  maintaining a previous first calibration counter and a previous second calibration counter for the previous time period and determining a previous estimated calibration CTR coefficient;
  performing a statistical test for determining whether the recent estimated calibration CTR coefficient and the previous estimated calibration CTR coefficient are the same or not; and
  in case it is determined, that the recent estimated calibration CTR coefficient and the previous estimated calibration CTR coefficient are not the same, determining an estimated time of change in the display layout of the slot.

6. The method according to claim 5, further comprising using the recent estimated calibration CTR coefficient for estimating CTR based on information obtained during the recent time period.

7. The method according to claim 5, further comprising using the previous estimated calibration CTR coefficient for estimating CTR based on information obtained during the previous time period.

8. The method according to claim 5, wherein time is divided into time windows of fixed size, the recent time period being a recent time window and the previous time period being a previous time window.

9. The method according to claim 5, wherein time is divided into time windows of fixed size, and the method further comprises:
  defining the previous time period as a time period from a time window of a last detected change time stamp to a given time window and defining the recent time period as a time period starting after the given time window to a recent time window.

10. The method according to claim 9, further comprising:
  dividing the time windows multiple times, wherein in each division the previous time period and the recent time period are of different sizes; and
  performing a statistical test for each division until a predefined number of divisions is reached and/or until the statistical test shows a sufficient difference between the previous time period and the recent time period.

11. The method according to claim 3, further comprising selecting page views or users for the calibration group.

12. The method according to claim 1, wherein the calibration group comprises part or all of total page views of all sources.

13. The method according to claim 1, wherein the first data collection counters and the second data collection counters are updated in real-time.

14. The method according to claim 1, wherein the calibration group is characterized by a varying size.

15. The method according to claim 1, wherein the one or more source includes only one source.

16. A non-transitory program storage device readable by a computer, tangibly embodying a program of instructions executable by the machine to perform operations of a method of estimating click through rate (CTR) of a recommendation, the recommendation is presented in at least one source; the source comprising a plurality of slots, each slot configured to present a served recommendation; wherein the computer comprises at least one processor and is operatively connected to a data-repository; the method comprising at least the following operations:
  performing a data collection process, comprising:
  for a given recommendation, serving the given recommendation in multiple page views in different slots of one or more sources;
  maintaining in the data repository a respective first data collection counter for counting a number of clicks on the given recommendation when served in any one of the one or more sources;
  maintaining in the data repository a respective second data collection counter such that each time the given recommendation is served in any given slot of any one of the one or more sources, an estimated CTR coefficient of the given slot is added to the second data collection counter;
  wherein the estimate calibration CTR coefficient is a value assigned to each slot presented in page views of a calibration group which are served randomly with recommendations;
  the estimate calibration CTR coefficient is based on a ratio between a first calibration counter and a second calibration counter; the first calibration counter counting the number of recommendations which are served randomly in a slot being part of the calibration group and the second calibration counter counting a number of clicks on the recommendations served in the slot;
  wherein during the data collection process, serving the recommendation in one or more sources, each source having one or more slots, does not increase a number of the first data collection counters and a number of the second data collection counters assigned to each recommendation; and
  determining an estimated CTR of the given recommendation in all served slots based on a ratio between the second data collection counter and the first data collection counter.

17. The program storage device according to claim 16, wherein the method further comprises the following operations:
  determining an estimated CTR of the given recommendation when served in a certain slot based on the estimated calibration CTR coefficient of the certain slot and the estimated CTR of the given recommendations in all served slots.

18. The program storage device according to claim 16, wherein the method further comprises the following operations:
   performing a calibration process comprising:
      serving recommendations randomly to slots presented in page views of the calibration group; for each slot:
      monitoring the served recommendations on the slot and maintaining the first calibration counter for counting the number of recommendations which are served in a slot;
      monitoring clicks on the slot and maintaining the second calibration counter for counting the number of clicks on recommendations served in the slot; and
      determining an estimated calibration CTR coefficient for the slot based on the ratio between the first calibration counter and the second calibration counter.

19. The program storage device according to claim 18, wherein the method further comprises the following operations:
   defining a recent time period and a previous time period;
   maintaining a recent first calibration counter and a respective recent second calibration counter for the recent time period and determining a recent estimated calibration CTR coefficient;
   maintaining a previous first calibration counter and a respective previous second calibration counter for the previous time period and determining a previous estimated calibration CTR coefficient;
   performing a statistical test for determining whether or not the recent estimated calibration CTR coefficient and the previous estimated calibration CTR coefficient are equal;
   in case it is determined, that the recent estimated calibration CTR coefficient and the previous estimated calibration CTR coefficient are not equal, determining an estimated time of change in a display layout of the slot; and
   using the recent estimated calibration CTR coefficient for estimating CTR based on information obtained during the recent time period.

20. The program storage device according to claim 19, wherein the method further comprises the following operations:
   using the previous estimated calibration CTR coefficient for estimating CTR based on information obtained during the previous time period.

21. The program storage device according to claim 19, wherein the method further comprises the following operations:
   dividing time into time windows of fixed size the recent time period being a recent time window and the previous time period being a previous time window.

22. The program storage device according to claim 19, wherein the method further comprises the following operations:
   dividing time into time windows of fixed size;
   defining the previous time period as a time period from a time window of a last detected change time stamp to a given time window and defining the recent time period as a time period starting after the given time window to a recent time window.

23. The program storage device according to claim 22, wherein the method further comprises the following operations:
   dividing the time windows multiple times, wherein in each division the previous time period and the recent time period are of different sizes; and
   performing a statistical test for each division until a predefined number of division is reached and/or until the statistical test shows a sufficient difference between the previous time period and the recent time period.

24. A computerized system, configured to estimate click through rate (CTR) of a recommendation, the recommendation is presented in at least one source, the source comprising a plurality of slots, each slot configured to present a served recommendation; the system comprising at least one processor operatively connected to a computer data repository and a computer non-transitory readable memory, the at least one processor being configured to:
   perform a data collection process, comprising:
      for a given recommendation, serving the given recommendation in multiple page views in different slots of one or more sources;
      maintaining in the data repository a respective first data collection counter for counting the number of clicks on the given recommendation when served in any one of the one or more sources;
      maintaining in the data repository a respective second data collection counter such that each time the given recommendation is served in any given slot of any one of the one or more sources, an estimated calibration CTR coefficient of the given slot is added to the second data collection counter;
   wherein the estimated calibration CTR coefficient is a value assigned to each slot presented in page views of a calibration group which are served randomly with recommendations;
   the estimated calibration CTR coefficient is based on a ratio between a first calibration counter and a second calibration counter; the first calibration counter counting a number of recommendations which are served randomly in a slot being part of the calibration group and the second calibration counter counting the number of clicks on the recommendations served in the slot;
   wherein during the data collection process, serving the recommendation in one or more sources, each source having one or more slots, does not increase a number of the first data collection counters and the number of the second data collection counters assigned to each recommendation; and
   determining an estimated CTR of the given recommendation in all served slots based on a ratio between the second data collection counter and the first data collection counter.

25. The computerized system according to claim 24, wherein the at least one processor is further configured to:
   determine an estimated CTR of the given recommendation when served in a certain slot based on the estimated calibration CTR coefficient of the certain slot and the estimated CTR of the given recommendation in all served slots.

26. The computerized system according to claim 24, wherein the at least one processor is further configured to perform a calibration process comprising:
   serving recommendations randomly to slots presented in page views of the calibration group;
   for each slot:
      monitoring the served recommendations on the slot and maintaining the first counter for counting the number of recommendations which are served in a slot;

monitoring clicks on the slot and maintaining the second counter for counting the number of clicks on recommendations served in the slot;

determining an estimated calibration CTR coefficient for the slot based on the ratio between the first calibration counter and the second calibration counter.

27. The computerized system according to claim 26, wherein the at least one processor is further configured to:

define, a recent time period and a previous time period;

maintain a recent first calibration counter and a respective recent second calibration counter for the recent time period and determining a recent estimated calibration CTR coefficient;

maintain a previous first calibration counter and a respective previous second calibration counter for the previous time period and determining a previous estimated calibration CTR coefficient;

perform a statistical test for determining whether the recent estimated calibration CTR coefficient and the previous estimated calibration CTR coefficient are the same or not;

in case it is determined, that the recent estimated calibration CTR coefficient and the previous estimated calibration CTR coefficient are not the same, determine an estimated time of change in a display layout of the slot; and utilize the recent estimated calibration CTR coefficient for estimating CTR based on information obtained during the recent time period.

28. The computerized system according to claim 27, further configured to:

utilize the previous estimated calibration CTR coefficient for estimating CTR based on information obtained during the previous time period.

29. The computerized system according to claim 27, further configured to:

divide time into time windows of fixed size the recent time period being a recent time window and the previous time period being a previous time window.

30. The computerized system according to claim 27, further configured to:

divide time into time windows of fixed size;

define the previous time period as a time period from a time window of a last detected change time stamp to a given time window; and defining the recent time period as a time period starting after the given time window to a recent time window.

31. The computerized system according to claim 30 further configured to:

divide the time windows multiple times, wherein in each division the previous time period and the recent time period are of different sizes; and perform a statistical test for each division until a predefined number of division is reached and/or until a statistical test shows a sufficient difference between the previous time period and the recent time period.

32. The computerized system according to claim 26, wherein the computer readable non-transitory memory comprises a calibration module configured with instructions for performing the calibration process and an estimation module configured with instructions for performing the data collection process and determining an estimated CTR.

* * * * *